(12) United States Patent
Cross et al.

(10) Patent No.: US 12,447,902 B2
(45) Date of Patent: Oct. 21, 2025

(54) MECHANISM WHICH ENABLES ACCESSORIES TO RECEIVE POWER WHEN ATTACHED TO A VEHICLE BAY DIVIDER

(71) Applicant: Rivian IP Holdings, LLC, Irvine, CA (US)

(72) Inventors: Lindsey Cross, Dana Point, CA (US); Jeremy Fu, Palo Alto, CA (US); Matthew Blunt, Costa Mesa, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 433 days.

(21) Appl. No.: 17/867,334

(22) Filed: Jul. 18, 2022

(65) Prior Publication Data
US 2024/0017676 A1    Jan. 18, 2024

(51) Int. Cl.
*B60R 7/08* (2006.01)
*B60R 5/04* (2006.01)
*B60R 7/02* (2006.01)
*B60R 16/03* (2006.01)

(52) U.S. Cl.
CPC .............. *B60R 7/08* (2013.01); *B60R 5/04* (2013.01); *B60R 7/02* (2013.01); *B60R 16/03* (2013.01)

(58) Field of Classification Search
CPC .... B60R 7/08; B60R 5/04; B60R 7/02; B60R 16/03; B60R 11/04; Y10S 292/37; Y10T 292/084; Y10T 292/0839
USPC ............ 248/220.21, 220.31, 220.41, 221.11, 248/222.11, 222.12
See application file for complete search history.

(56) References Cited

U.S. PATENT DOCUMENTS

| | | | |
|---|---|---|---|
| 2,437,299 A * | 3/1948 | Jacobi | E05C 5/00 292/168 |
| 4,003,618 A | 1/1977 | Booty | |
| 4,681,233 A * | 7/1987 | Roth | A47F 5/0823 D6/567 |
| 5,306,156 A | 4/1994 | Gibbs et al. | |
| 5,346,266 A * | 9/1994 | Bisbing | E05C 5/00 292/64 |
| 5,791,171 A * | 8/1998 | Kelley | E05B 67/36 70/57 |
| 6,048,001 A * | 4/2000 | Miller | E05C 3/24 292/220 |
| 6,851,735 B2 * | 2/2005 | Hicks | B60R 7/02 224/511 |
| D643,704 S * | 8/2011 | Koehn | D8/367 |
| 8,505,794 B2 | 8/2013 | Ardigo | |

(Continued)

*Primary Examiner* — Kimberly T Wood
(74) *Attorney, Agent, or Firm* — Haley Guiliano LLP

(57) ABSTRACT

Systems and methods are presented herein for a vehicle bay divider comprising a plurality of powered through openings configured to interface with a locking mechanism, where the locking mechanism affixes an accessory to the vehicle bay divider enabling a powered connection between at least one of the through openings and the powered accessory. Each of the through openings comprises at least one interface configured to provide power through physical leads or wirelessly. The locking mechanism may comprise tabs or pegs configured to be received by the through openings and secure the powered accessory to the vehicle bay divider. The locking mechanism may comprise a push-push assembly and linkages that cause the tabs or pegs to translate in opposing direction into engaged and disengaged positions.

19 Claims, 8 Drawing Sheets

(56) References Cited

U.S. PATENT DOCUMENTS

| | | | | |
|---|---|---|---|---|
| 9,560,923 | B1* | 2/2017 | Winnard | B25H 3/04 |
| 10,105,764 | B2* | 10/2018 | Pamatmat | B23B 51/0473 |
| 11,066,004 | B2 | 7/2021 | Schroeder et al. | |
| 2003/0209956 | A1* | 11/2003 | Bae | B60N 2/793 |
| | | | | 312/324 |
| 2010/0175919 | A1* | 7/2010 | Ellis | H01R 25/16 |
| | | | | 174/481 |
| 2017/0188722 | A1* | 7/2017 | Winnard | A47F 7/0021 |
| 2017/0291228 | A1* | 10/2017 | Pamatmat | B23B 51/0473 |

\* cited by examiner

MECHANISM WHICH ENABLES ACCESSORIES TO RECEIVE POWER WHEN ATTACHED TO A VEHICLE BAY DIVIDER

INTRODUCTION

The present disclosure is directed to a locking mechanism for securing an accessory to a vehicle bay divider, and, more particularly, a locking mechanism configured to interface with a powered vehicle bay divider to secure and provide power to an accessory affixed to the vehicle bay divider using the mechanism.

SUMMARY

Accessories, or tools, interfacing with a wall storage panel lack a means to receive power when engaged with a feature of the panel. Additionally, wall storage panels are configured to provide unsecured storage in that an accessory may be hung from the panel, however the accessory is not affixed to the panel. The present disclosure is directed to a vehicle bay divider, a pegboard, a panel, and/or a vehicle bay divider configured to provide power to accessories and tools which interface with features of the vehicle bay divider. Additionally, the disclosure is also directed to a locking mechanism which provides a secure connection between an accessory, or tool, and a vehicle bay divider while also providing a powered coupling between the vehicle bay divider and the accessory, or tool, such that the accessory, or tool, can function when affixed to the vehicle bay divider via the locking mechanism.

In some embodiments, a vehicle bay divider of the present disclosure comprises a plurality of through openings in the vehicle bay divider and at least one interface configured to provide electric power to a respective through opening of the plurality of through openings. The through openings (e.g., slots) of the vehicle bay divider may be configured to provide power wirelessly to the accessory affixed to the vehicle bay divider via the locking mechanism. In some embodiments, the through openings or slots of the vehicle bay divider comprise leads or contacts to which the locking mechanism can be secured and are configured to provide power to accessories secured to the vehicle bay divider.

In some embodiments, the plurality of through openings comprises a first subset of the plurality of through openings and a second subset of the plurality of through openings. Each of the first and second subsets of the plurality of openings are arranged at respective different spacings. Additionally, each of the plurality of through openings are structured to receive a securing feature of a mountable accessory. Each through opening of the first subset of the plurality of through openings comprises an elongated opening oriented vertically. Each through opening of the second subset of the plurality of through openings comprises an elongated opening oriented horizontally.

In some embodiments, an edge of the vehicle bay divider comprises at least one mounting anchor configured to affix the vehicle bay divider to a mounting surface. The at least one mounting anchor may comprise a clamping mechanism along the at least one edge configured to interface with an extension of the mounting surface. In some embodiments, the at least one mounting anchor comprises at least one mechanical coupling configured to connect an electronic lead of the vehicle bay divider to a complementary electronic lead in the mounting surface. The vehicle bay divider may further comprise an energy storage apparatus configured to store an electric charge to provide electric power to each of the plurality of through openings.

In some embodiments, the at least one interface comprises a first electrical lead arranged on a first side of each of the plurality of through openings and a second electrical lead arranged on a second side of each of the plurality of through openings. A first polarity of the first electrical lead is different from a second polarity of the second electrical lead. In some embodiments, a first opening of the plurality of through openings comprises a first electrical feature and a second opening of the plurality of through openings comprises a second electrical feature. Additionally, a first polarity of the first electrical feature is different from a second polarity of the second electrical feature. The first opening and the second opening are configured to interface with a pair of electrical leads from a same mountable apparatus to provide electrical power to the mountable apparatus.

In some embodiments, the disclosure is directed to a system comprising a mountable apparatus (e.g., a tool or accessory), and a surface (e.g., a vehicle bay divider, a pegboard, and/or a panel) comprising at least one through opening configured to receive the mountable apparatus, wherein the at least one through opening comprises a pair of elongated sides configured to couple with at least one mounting peg of the mountable apparatus. The mountable apparatus comprises at least one electrical feature configured to receive electrical power from the at least one through opening, and the mountable apparatus may be configured to receive an electrical charge wirelessly when arranged in or near the at least one through opening. The at least one through opening comprises an interface between the at least one through opening and the mountable apparatus structured to withstand a weight of the mountable apparatus and vibrational motion transmitted via the mountable apparatus. In some embodiments, the system further comprises an energy storage apparatus configured to store an electric charge to provide electric power to the at least one through opening.

In some embodiments, the disclosure is directed to a vehicle comprising at least one storage bay comprising a mounting surface, and a panel comprising at least one through opening, wherein the at least one through opening is configured to provide power to at least one mountable accessory.

In some embodiments, the disclosure is directed to a locking mechanism comprising a push-push assembly arranged to actuate along a first axis. The locking mechanism further comprises a first linkage and a second linkage coupled to the push-push assembly. Additionally, a first sliding peg and a second sliding peg respectively coupled to the first linkage and the second linkage, wherein actuation of the push-push assembly causes the first sliding peg and the second sliding peg to translate in opposing directions, along a second axis different from the first axis, into an engaged position. In some embodiments, the locking mechanism further comprises a first spring and a second spring respectively coupled to the first sliding peg and the second sliding peg and configured to apply spring forces to the first sliding base and the second sliding base to cause the first sliding peg and the second sliding peg to translate towards each other into a disengaged position.

In some embodiments, the locking mechanism comprises two pegs that are spring loaded to affix the accessory using the locking mechanism to a through opening of the vehicle bay divider. The spring loaded pegs are configured to prevent motion along X, Y, and Z axes. Additionally, the two pegs prevent rotation of the accessory. In some embodiments, the ability of the pegs to prevent relative motion of an accessory to a vehicle bay divider is particularly useful for when the vehicle bay divider is being transported or is arranged to receive accessories in a mobile work area (e.g., in a vehicle bay). A push-push assembly may be utilized to change the locking mechanism of the accessory from a disengaged or moveable configuration to an engaged or locked configuration when interfacing with a through opening of a vehicle bay divider. In some embodiments, a push-push assembly is incorporated to allow the accessory to remain in a locked or unlocked state relative to a through opening in the vehicle bay divider.

In some embodiments, the locking mechanism comprises a first anchor and a second anchor, wherein the first and second sliding pegs are configured to be translated towards the first and second anchor, respectively, in response to actuation of the push-push assembly.

In some embodiments, each of the first and second peg of the locking mechanism is arranged to extend through an interior surface of an accessory housing and actuate such that each of the first and second peg contact an edge of at least one through opening in a vehicle bay divider arranged to receive the first and second peg. Each of the first and second anchors comprises an extension from a material comprising the accessory housing. Additionally, the first linkage is configured to rotate about a first pivot point corresponding to the first sliding peg and the second linkage is configured to rotate about a second pivot point corresponding to the second sliding peg. The first sliding peg and the second sliding peg are spaced within an accessory housing according to a spacing of through openings in a complementary vehicle bay divider.

In some embodiments, at least one guide rod is arranged within the accessory housing and configured to counteract compression achieved via the push-push assembly via at least one spring arranged concentric to a central axis of the at least one guide rod, either external to an outer diameter of a housing of the at least one guide rod or internal to an inner diameter of a housing of the at least one guide rod. A return spring interfacing with the guide rod is configured to counteract the compression.

In some embodiments, the push-push assembly is coupled to a guide rod configured to return the push-push assembly to a disengaged position, wherein the disengaged position corresponds to each of the first linkage, the second linkage, the first sliding peg, and the second sliding peg being translated away from an interface on a vehicle bay divider opening and translated towards a center axis of the push-push assembly.

In some embodiments, the locking mechanism comprises at least one rotary tab of a shape substantially similar to the vehicle bay divider through opening, wherein the at least one rotary tab can be rotated from a position where a main extension of the at least one rotary tab is substantially aligned to the vehicle bay divider through opening to a position wherein the main extension is perpendicular to the vehicle bay divider through opening. The at least one rotary tab is configured to prevent movement, including rotation, of the accessory relative to the vehicle bay divider when the at least one rotary tab is arranged in an engaged position relative to the vehicle bay divider through opening. Raised edges may be incorporated into a rear surface of the vehicle bay divider to guide the at least one rotary tab into the perpendicular orientation. Additionally, one or more of the rotary tabs may be incorporated into a single accessory, wherein each of the one or more rotary tabs are coupled to one or more push-push-assembly and actuated via at least one linkage assembly.

In some embodiments, the disclosure is directed to a mountable accessory comprising an accessory housing and a locking mechanism. The locking mechanism comprises a push-push assembly, and at least two opposing linkages coupled to opposing sides of the push-push assembly, wherein each of the at least two opposing linkages is coupled to a first sliding peg and a second sliding peg, respectively, each comprising respective tabs to interface with an edge of a through opening. In some embodiments, each of the tabs is configured to rotate perpendicular to an elongated edge of the through when the push-push assembly is actuated along a first axis.

In some embodiments, the accessory housing is configured to receive an accessory apparatus. The accessory housing is affixed to an accessory comprising one of a securing mechanism, a camera, a light, an environment condition controller, or a tool.

In some embodiments, the push-push assembly is configured to actuate along a first axis perpendicular to an axis corresponding to translation of the at least two opposing linkages. The locking mechanism further comprises at least two springs, arranged between each of the at least two opposing linkages and each of the first and second base, configured to return each of the at least two opposing linkages to an initial position after being displaced in opposing directions. At least one guide rod is configured to counteract compression of the push-push assembly. Additionally, the housing comprises mounting features configured to receive and secure an accessory apparatus.

In some embodiments, the disclosure is directed to a mounting assembly comprising a vehicle bay divider and a mountable apparatus. The mountable apparatus comprises an accessory coupled to a locking mechanism. The locking mechanism comprises a push-push assembly arranged to actuate along a first axis, and at least two opposing latching tabs coupled via at least two linkages to the push-push assembly and arranged to actuate along a second axis.

In some embodiments, the accessories secured to the vehicle bay divider comprise monitoring apparatuses for the environment surrounding the vehicle bay divider. For example, a camera may be secured to the vehicle bay divider. The camera may be communicably coupled to at least one of a vehicle display system or a remote mobile device such that a user can view the status of items or pets within an enclosure with the vehicle bay divider. Additional pet related accessories may include a food dispenser controllable by a remote device or a vehicle interface, a water dispenser controllable by the remote device or the vehicle interface, and an environment condition controlling apparatus such as a fan, dehumidifier, or heater. The vehicle bay divider may be arranged to separate pets and cargo in a vehicle bay, for example. Each separated area may comprise different accessories for monitoring and controlling different conditions, depending on whether the separated area is used for cargo or for a pet. Cargo related accessories may include hooks, chargers, and cameras which may be communicably coupled (e.g., for controlling the accessory or monitoring the cargo area) to at least one of a remote mobile device or a vehicle interface.

BRIEF DESCRIPTIONS OF THE DRAWINGS

The above and other objects and advantages of the disclosure may be apparent upon consideration of the following detailed description, taken in conjunction with the accompanying drawings, in which.

Figure 9:
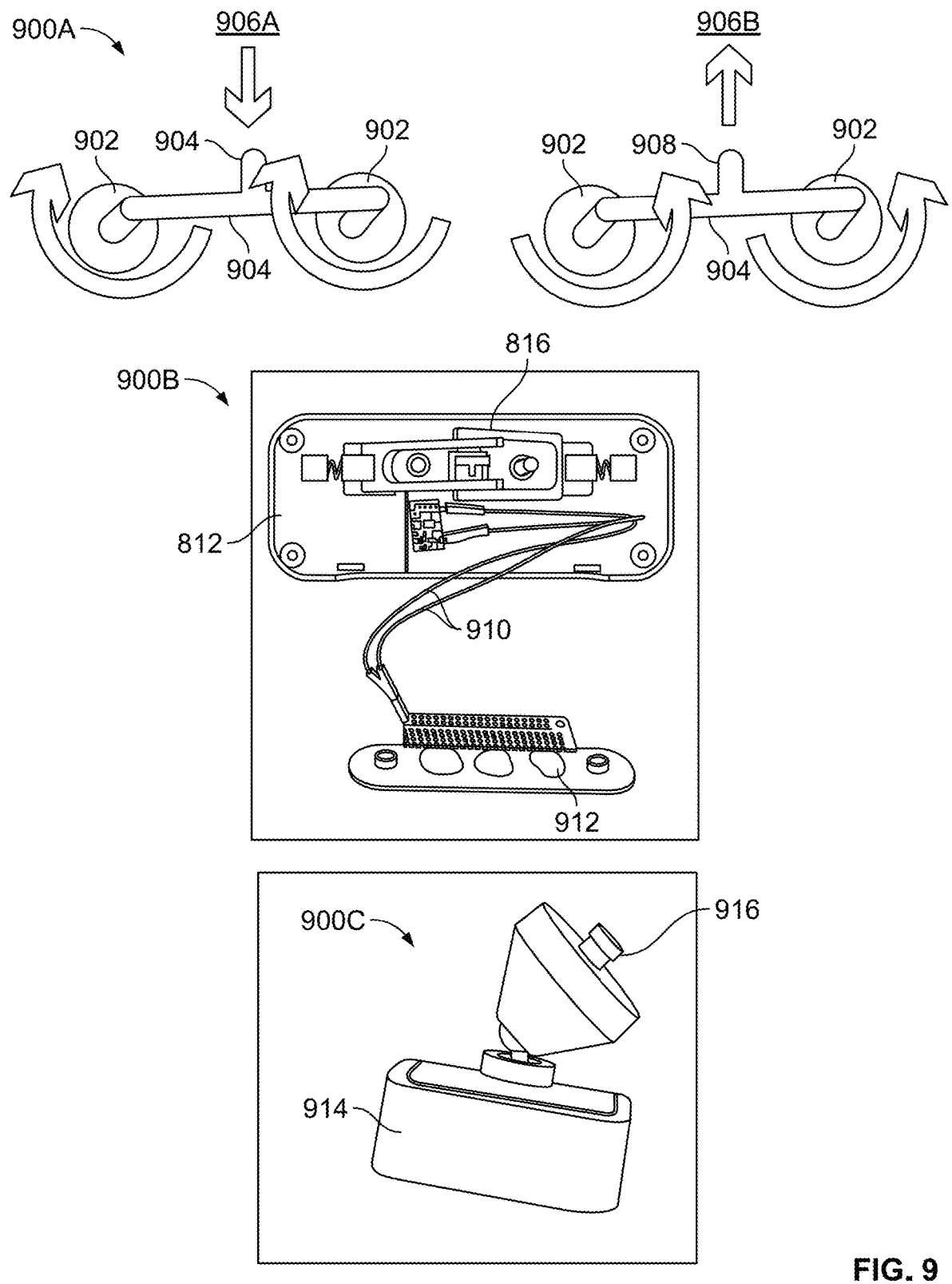
Figure 10:
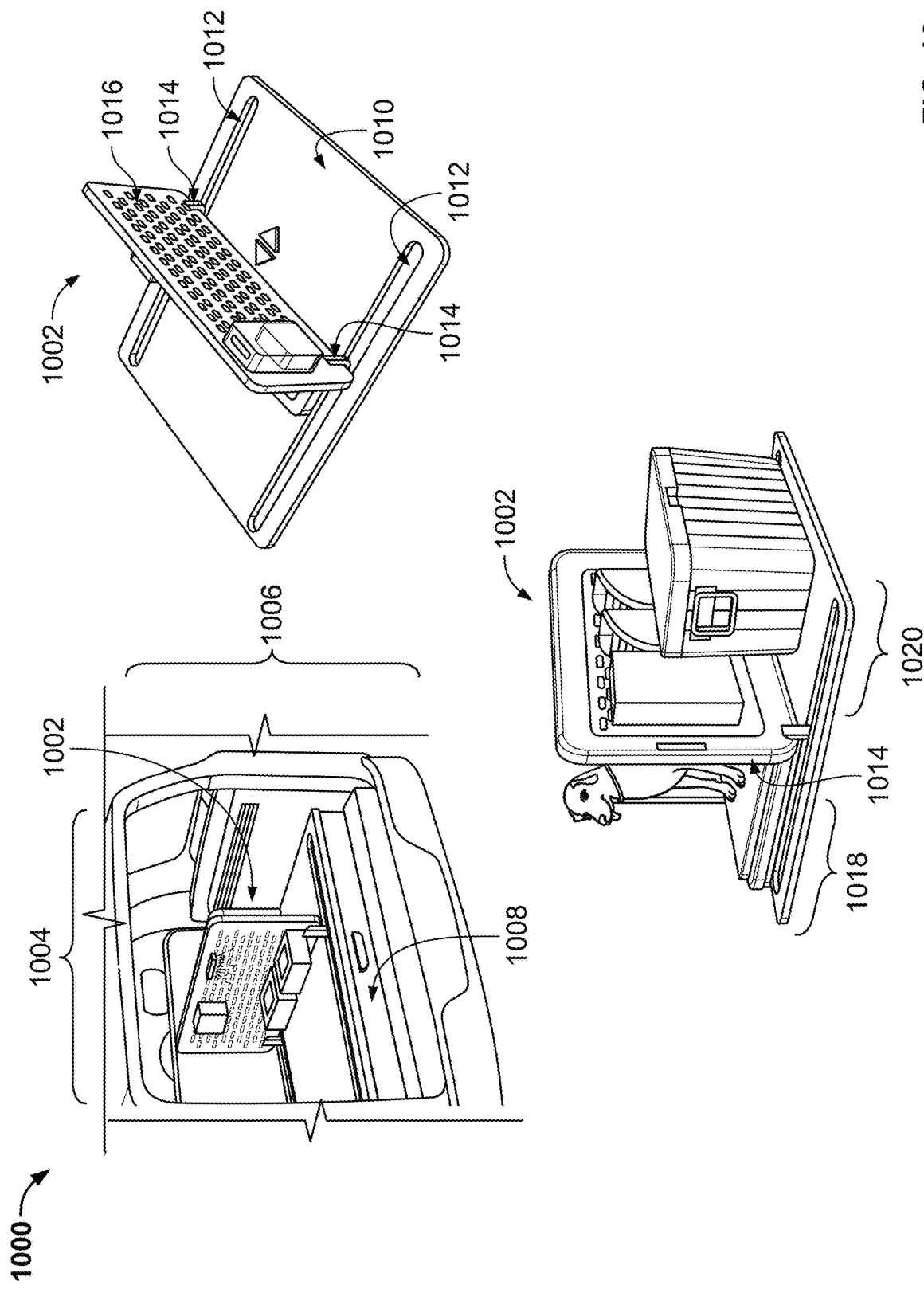

FIG. 9 depicts exemplary pegs and mountable apparatuses configured to engage with a through opening in a vehicle bay divider via the depicted exemplary rotatable pegs, in accordance with some embodiments of the disclosure; and FIG. 10 depicts an exemplary vehicle bay with an exemplary vehicle bay divider arranged within the exemplary vehicle bay, in accordance with some embodiments of the disclosure.

DETAILED DESCRIPTION

Methods and systems are provided herein for a locking mechanism configured to interface with a vehicle bay divider comprising a plurality of powered through openings, wherein the locking mechanism affixes an accessory to the vehicle bay divider enabling a powered connection between at least one of the through openings and the powered accessory.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
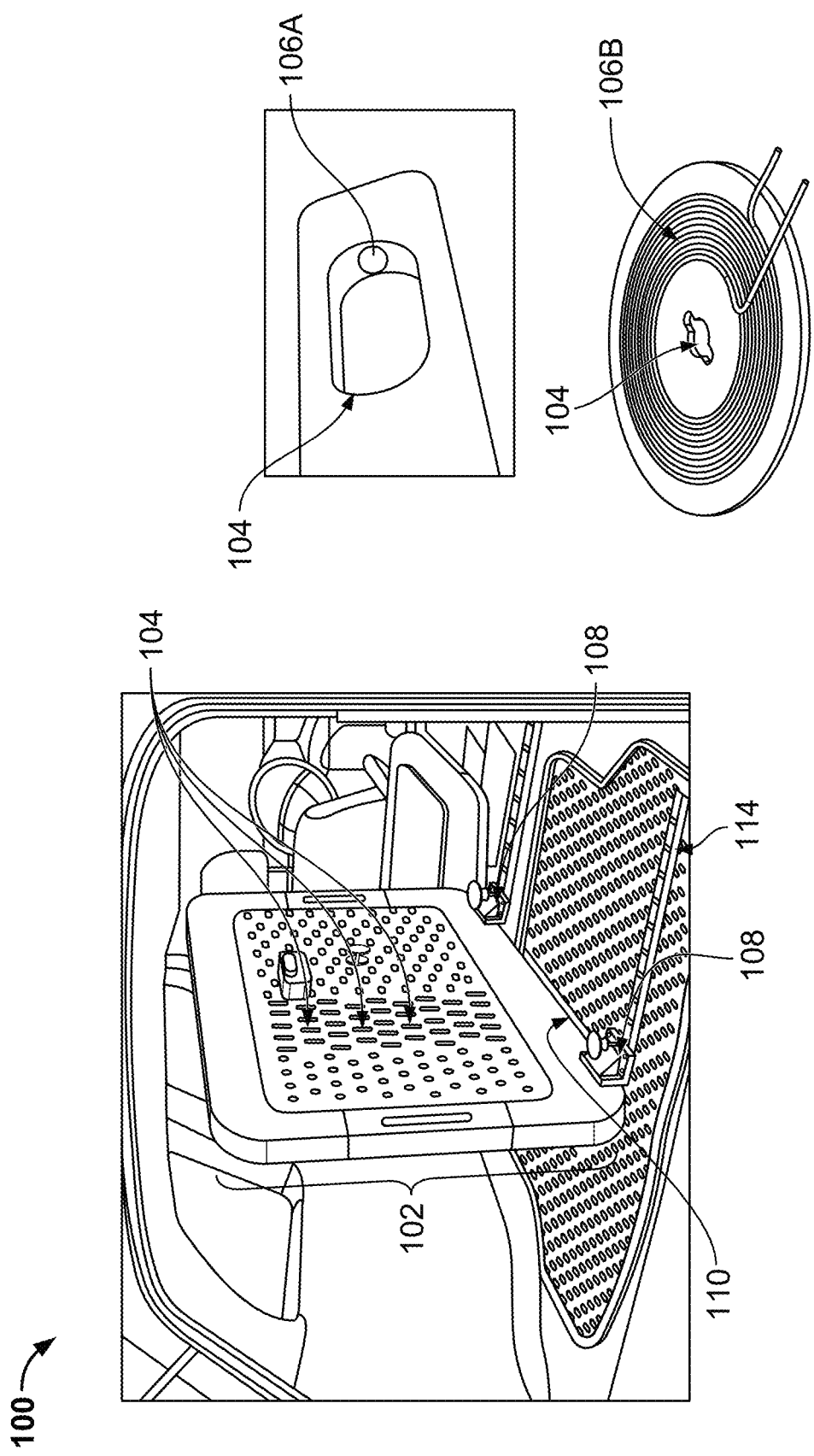
FIG. 1 depicts an exemplary vehicle bay divider comprising a plurality of through openings with at least one interface configured to provide electric power to each of the plurality of through openings, in accordance with some embodiments of the disclosure.

FIG. 1 depicts vehicle bay divider 102 comprising through openings 104 with at least one of electrical interface 106A and 106B, where each of electrical interface 106A and 106B are configured to provide electric power to each of through openings 104, in accordance with some embodiments of the disclosure. Vehicle bay divider 102 may comprise fewer or additional elements or features than those depicted in FIG. 1. Additionally, vehicle bay divider 102 may be incorporated into, may interface with, and/or may comprise any or all the elements depicted in, or described in reference to, any of FIGS. 2-10.

Vehicle bay divider 102 comprises multiple subsets of through openings 104, each subset with different spacings and orientations along the surface of vehicle bay divider 102. For example, a first subset of through openings 104 may comprise two parallel sides with two rounded ends arranged such that the two parallel sides align with a top and a bottom of vehicle bay divider 102. A second subset of through opening 104 may also comprise two parallel sides with two rounded ends arranged such that the two parallel sides align with two vertical sides of vehicle bay divider 102. A third subset of through openings 104 may comprises substantially circular openings which, as depicted in FIG. 1, may be arranged towards either or both vertical ends of vehicle bay divider 102. Each of the first, second, and third subsets of through openings 104 may be incorporated into vehicle bay divider 102. In some embodiments, only one or two of these subsets are incorporated into vehicle bay divider 102. Each of through openings 104 is formed in a surface such than material comprising the edge of each of through openings 104 comprises at least one of electrical interface 106A and/or 106B. Electrical interface 106A comprises an electronic lead embedded in an edge of through openings 104. The electronic lead is configured to provide electronic power to a complementary lead of a mountable apparatus. Electrical interface 106B comprises a coil configured to provide electronic power to a mountable apparatus when the mountable apparatus is arranged within one of through openings 104 or arranged to interface with an edge of one of through openings 104. Electrical interface 106B is configured to wireless provide power to the mountable apparatus and may be implemented where there is a risk that repeated installation and removal of the mountable apparatus creates a risk for wearing out or corroding electrical interface 106A.

Figure 7:
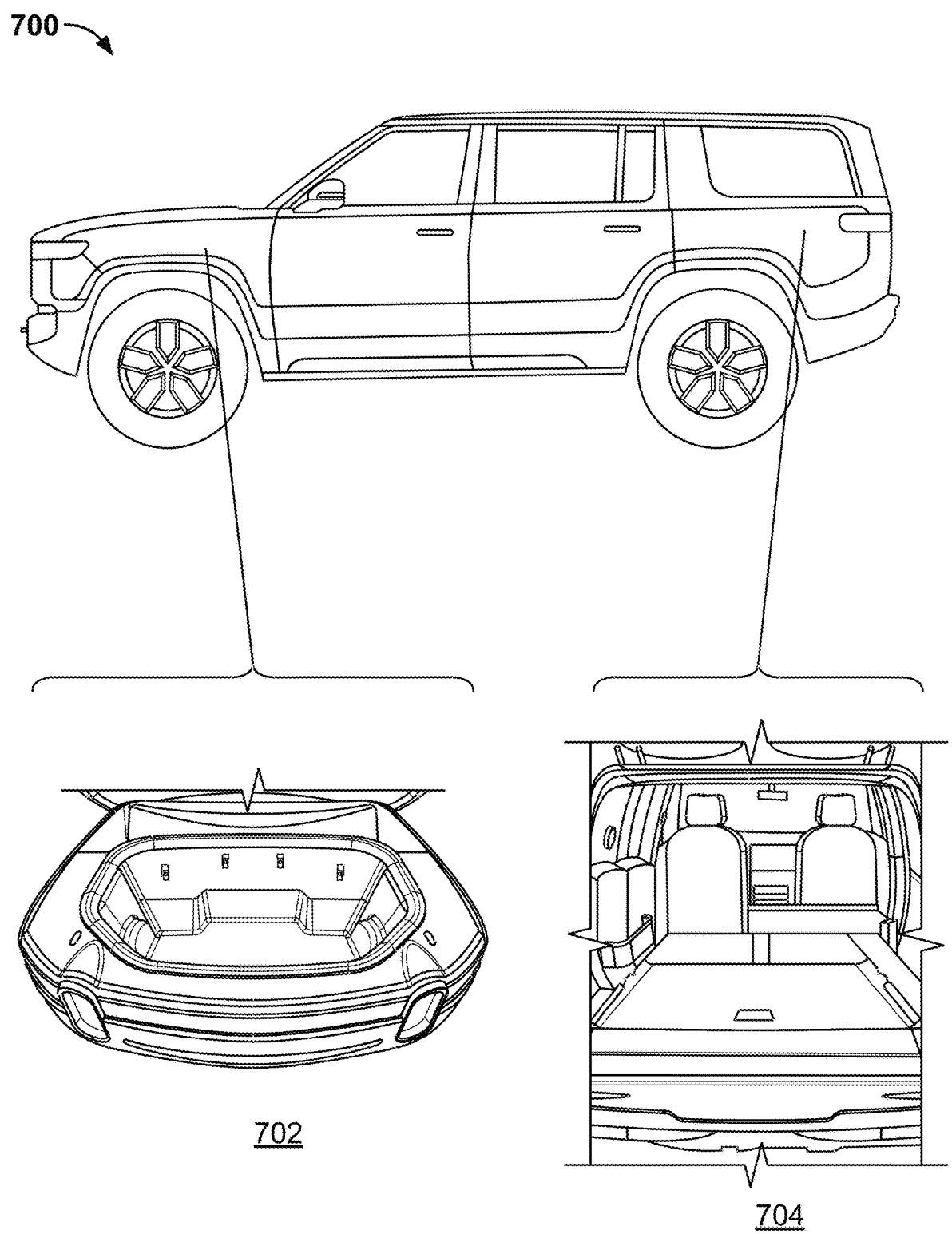
FIG. 7 depicts an exemplary vehicle comprising a front vehicle bay and a rear vehicle bay, in accordance with some embodiments of the disclosure.

Vehicle bay divider 102 further comprises edge 110. Edge 110 is configured to interface with mounting surface 112. Mounting surface 112 corresponds to a surface of a vehicle bay, as depicted in FIG. 7 as part of vehicle 700. In some embodiments, a pair of rails may be secured to mounting surface 112. Mounting anchors 108 are arranged along edge 110 and are configured to interface with mounting surface 112 or a feature secured to mounting surface 112 (e.g., a pair of rails). One of mounting anchors 108 may be configured to slide along a first axis on mounting surface 112. A second of mounting anchors 108 may comprise a clamping mechanism configured to secure vehicle bay divider 102 in a position along mounting surface 112. For example, one or both of mounting anchors 108 may comprising a threaded nob or mechanical coupling configured to be screwed into a hole in a feature secured in mounting surface 112 or a hole directly in mounting surface 112. In some embodiments, one or both of mounting anchors are configured to clamp onto a feature of mounting surface 112, such as feature 114 which is depicted as a rail in FIG. 1. When each of mounting anchors 108 are in a locked configuration, vehicle bay divider 102 is secured along edge 110 such that vehicle bay divider 102 is incapable of movement relative to mounting surface 112. In some embodiments, at least one of mounting anchors 108 comprises an electronic lead configured to interface with a complementary electronic lead in mounting surface 112 (not shown in FIG. 1, see FIG. 4). Additionally, vehicle bay divider 102 may comprise an energy storage apparatus such as a battery assembly which is configured to provide electric power to each of through openings 104.

Figure 2:
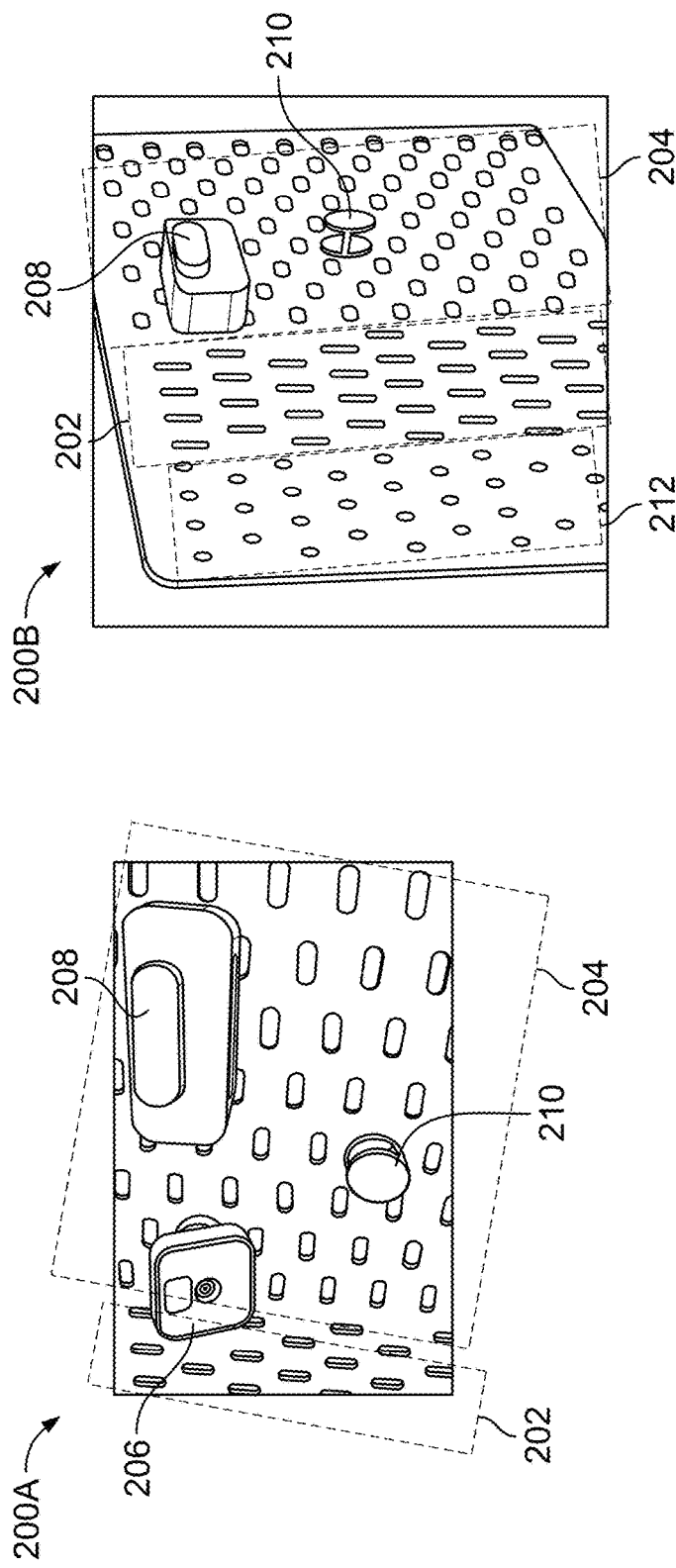
FIG. 2 depicts an exemplary vehicle bay divider comprising a first and a second subset of through openings, in accordance with some embodiments of the disclosure.

FIG. 2 depicts vehicle bay dividers 200A and 200B comprising respective subsets of through openings 104, in accordance with some embodiments of the disclosure. Vehicle bay dividers 200A and 200B may comprise fewer or additional elements or features than those depicted in FIG. 2. Additionally, vehicle bay dividers 200A and 200B may be incorporated into, may interface with, and/or may comprise any or all the elements depicted in, or described in reference to, any of FIGS. 1 and 3-10.

Vehicle bay divider 200A comprises first plurality of through openings 202 and second plurality of through openings 204. Each of the openings of first plurality of through openings 202 comprise a pair of parallel sides aligned with a vertical side of vehicle bay divider 200A and a pair of rounded ends. In some embodiments, each of the openings of the first plurality of through openings 202 corresponds to a first subset of through openings, each comprising an elongated opening oriented vertically. Each of the openings of second plurality of through openings 204 comprise a pair of parallel sides aligned with a horizontal side of vehicle bay divider 200A and a pair of rounded ends. In some embodiments, each of the openings of the second plurality of through openings 204 corresponds to a second subset of through openings, each comprising an elongated opening oriented horizontally. The elongated through openings are configured to receive the mountable apparatus (e.g., the securing tabs or mounting pegs of the mountable apparatus), wherein the at least one elongated through opening comprises a pair of opposing ends configured to couple with at least one mounting peg of the mountable apparatus.

Mounted to vehicle bay divider 200A are mountable accessories 206, 208, and 210. Mountable accessory 206 comprises a camera which may be communicably coupled to a remote device. The remote device may comprise a mobile smart phone which enables a user to control mountable accessory 206 (e.g., power on or off, record video, and other related camera functions). Mountable accessory 208 comprises a light powered on and powered off by a push-push assembly. Mountable accessory 210 comprises a mounting apparatus which can be rotated into a secured position in one of the through openings of either of first plurality of through openings 202 or second plurality of through openings 204. Each of mountable accessories 206, 208, and 210 may be mounted to vehicle bay divider 200A by interfacing with at least one opening from either of first plurality of through openings 202 and second plurality of through openings 204, depending on the desired orientation of each of the mountable accessories and the size of the features extending from the mountable accessories which, when articulated, lock the mountable accessory to vehicle bay divider 200A.

Vehicle bay divider 200B comprises first plurality of through openings 202, second plurality of through openings 204, and third plurality of through openings 212. Each openings of third plurality of through openings 212 comprises a circular diameter configured to receive substantially rounded securing features from mounting apparatuses. Mounted to vehicle bay divider 200A are mountable accessories 208, and 210. Each of mountable accessories 206, 208, and 210 may be mounted to vehicle bay divider 200B by interfacing with at least one opening from any of first plurality of through openings 202, second plurality of through openings 204, and third plurality of through openings 212, depending on whether any of the mountable accessories comprises features configured to interface with the different shaped through openings.

Figure 3:
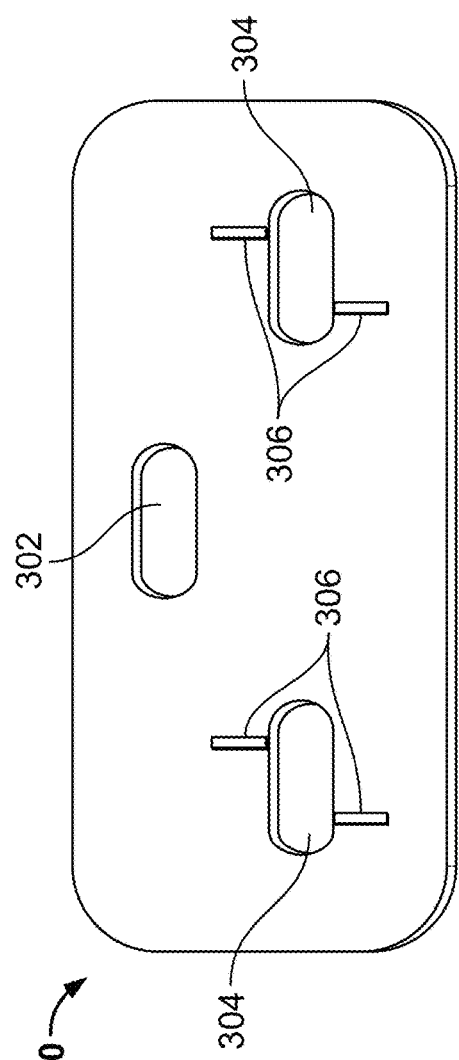
FIG. 3 depicts an exemplary vehicle bay divider comprising a through opening comprising features to interface with pegs of a mountable accessory and structural elements for supporting the mountable accessory, in accordance with some embodiments of the disclosure.

FIG. 3 depicts vehicle bay divider 300 comprising through openings 302 and 304, wherein through openings 304 comprise features 306, in accordance with some embodiments of the disclosure. Vehicle bay divider 300 may comprise fewer or additional elements or features than those depicted in FIG. 3. Additionally, vehicle bay divider 300 may be incorporated into, may interface with, and/or may comprise any or all the elements depicted in, or described in reference to, any of FIGS. 1, 2, and 4-10.

Through opening 302 comprises a pair of parallel sides and a pair of rounded ends configured to interface with pegs of a mountable accessory. For example, a peg of a mountable accessory may be shaped to fit into through opening 302 and then may be rotated perpendicular to the pair of parallel sides or may slide towards at least one of the rounded ends to create a secure engagement between the mountable accessory and through opening 302. Each of through openings 304 also comprise pair of parallel sides and a pair of rounded ends configured to interface with pegs of a mountable accessory. Additionally, through openings 304 comprise features 306 which act as end stops for a rotating peg of a mountable accessory and may also be configured as structural elements for supporting the mountable accessory by increasing the stiffness of the material that forms each of openings 304. For example, the addition of features 306 may increase the bending strength of vehicle bay divider 300 such that a mountable accessory does not plastically or elastically deform the material comprising vehicle bay divider 300 (e.g., a heavier mountable accessory may be affixed to vehicle bay divider 300 with features 306 than would be affixed to a vehicle bay divider comprising only through opening 302). Features 306 are configured such that through openings 304 are structured to withstand a weight of the mountable apparatus and vibrational motion transmitted via the mountable apparatus (e.g., caused by vehicle motion when vehicle bay divider 300 is mounted in a vehicle bay).

Figure 4:
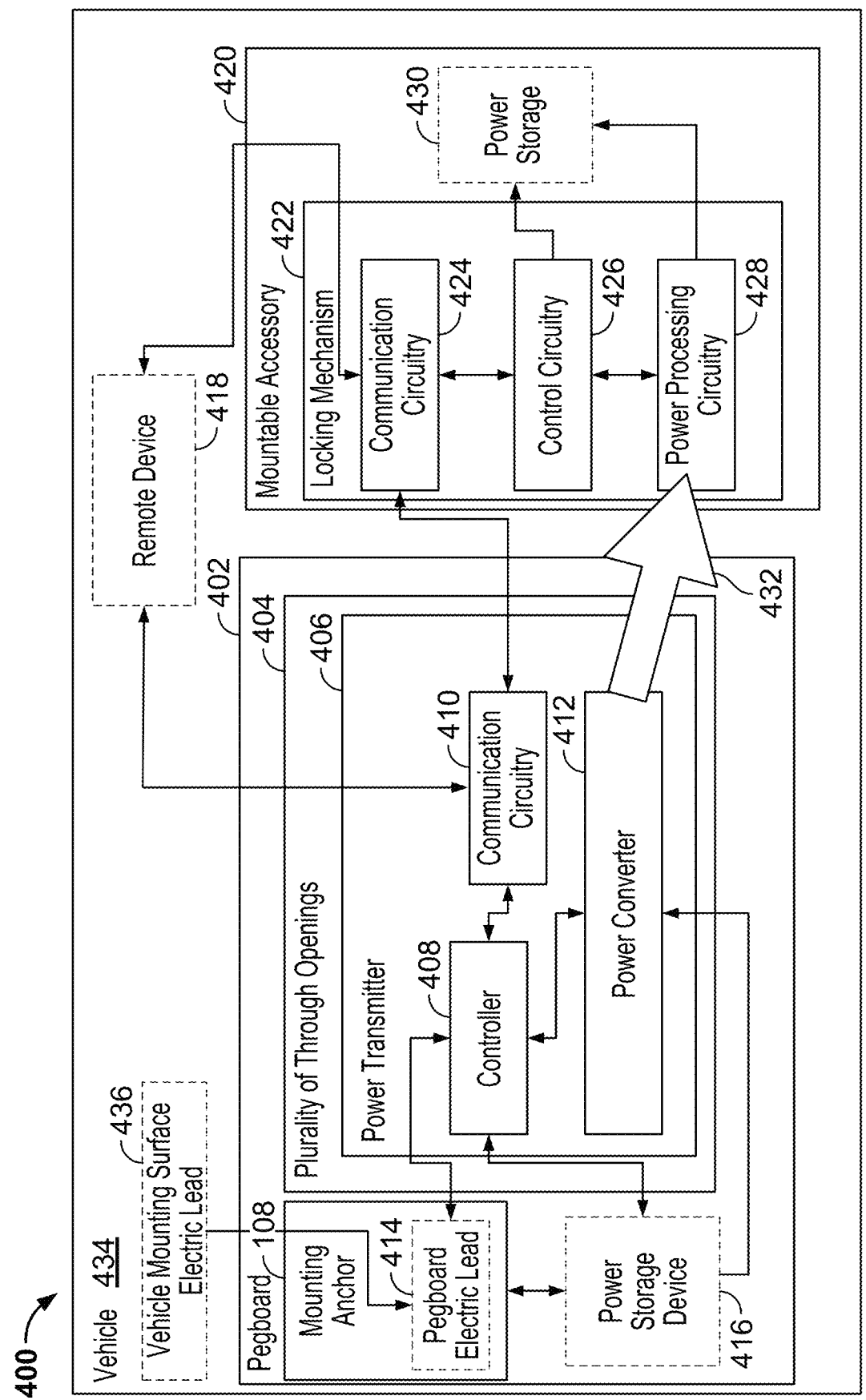
FIG. 4 is a block diagram of an exemplary system comprising a vehicle bay divider configured to provide electrical power and a mountable accessory configured to receive the electrical power provided via the vehicle bay divider, in accordance some embodiments of the disclosure.

FIG. 4 depicts mounting system 400 comprising vehicle bay divider 402 which is configured to provide electrical power to mountable accessory 420, in accordance some embodiments of the disclosure. Mounting system 400 may comprise fewer or additional elements or features than those depicted in FIG. 4. Additionally, mounting system 400 may be incorporated into, may interface with, and/or may comprise any or all the elements depicted in, or described in reference to, any of FIGS. 1-3 and 5-10.

Mounting system 400 comprises vehicle bay divider 402, which corresponds to vehicle bay divider 102 of FIG. 1. Vehicle bay divider 402 comprises plurality of through opening 404 which interface with power transmitter 406. Power transmitter 406 corresponds to an apparatus such as electrical interface 106A or 106B of FIG. 1. For example, power transmitter 406 may be configured for a mechanical connection to mountable accessory 420 by being structured as a plug with electronic leads. In some embodiments, power transmitter 406 may be configured to wirelessly charge mountable accessory 420 and does not need a direct connection with mountable accessory 420. Power transmitter comprises controller 408, communication circuitry 410 and power converter 412. Controller 407 is configured to direct instruction received via communication circuitry 410 such that power is accessed either via vehicle bay divider electric lead 414 and/or power storage device 416. Vehicle bay divider electric lead 414 may be a component of mounting anchor 108 of FIG. 1. Vehicle bay divider electric lead 414 is configured to receive electric power from vehicle mounting surface electric lead 436. Vehicle mounting surface electric lead 436 may be embedded in a mounting surface of front vehicle bay 702 and rear vehicle bay 704 of FIG. 7, corresponding to a vehicle bay of vehicle 434. In some embodiments, vehicle mounting surface electric lead 436 may be a component of feature 114 of FIG. 1. Power storage device 416 corresponds to a battery apparatus which can retain an electrical charge such that vehicle bay divider 402 is a stand-alone power source or can be used to draw electric power from a vehicle battery. Each of controller 408, power storage device 416, and vehicle bay divider to vehicle power electric coupling 414 are communicably coupled to provide a means to regulate the source and amount of electric power 432 to be transmitted via power converter 412 to power processing circuitry 428 of mountable accessory 420.

Communication circuitry 410 is configured to transmit and receive messages from mountable accessory 420 and/or remote device 418. For example, remote device 418 may correspond to a smart phone, a tablet, or a vehicle communication interface where a user can monitor and adjust the power supplied to mountable accessory 420. Additionally, mountable accessory 420 comprises locking mechanism 422 which is communicably coupled to communication circuitry 424 such that both vehicle bay divider 402 and remote device 418 may receive status updates regarding the engagement status of mountable accessory 420 as well as the charging status of mountable accessory 420. Communication circuitry 424 of locking mechanism 422 may transmit and receive information via a bilateral communication path with communication circuitry 410 as well as remote device 418. Based at least one of a command received or a status received, communication circuitry 424 interfaces with control circuitry 426 to regulate how power processing circuitry 428 handles electric power 432 received from power converter 412. For example, mountable accessory 420 may comprises power storage 430 which may be charged via electric power 432 or electric power 432 may be directed to a current function of mountable accessory 420. Mountable accessory 420 may comprise a light or a camera which when mounted to vehicle bay divider 402 uses power from power converter 412. In some embodiments, mountable accessory 420 is configured to function when not mounted to vehicle bay divider 402 and may function using power stored in power storage 430. Remote device 418 may be configured to allow a user to select a charging mode, a power storage mode, or combination thereof to maximize the function of mountable accessory 420. Each of the depicted elements of mounting system 400 may comprise processors and the like configured to store a non-transitory computer readable medium with computer readable instructions to enable either direct or wireless communication between the various elements depicted to execute the functions described herein.

Figure 5:
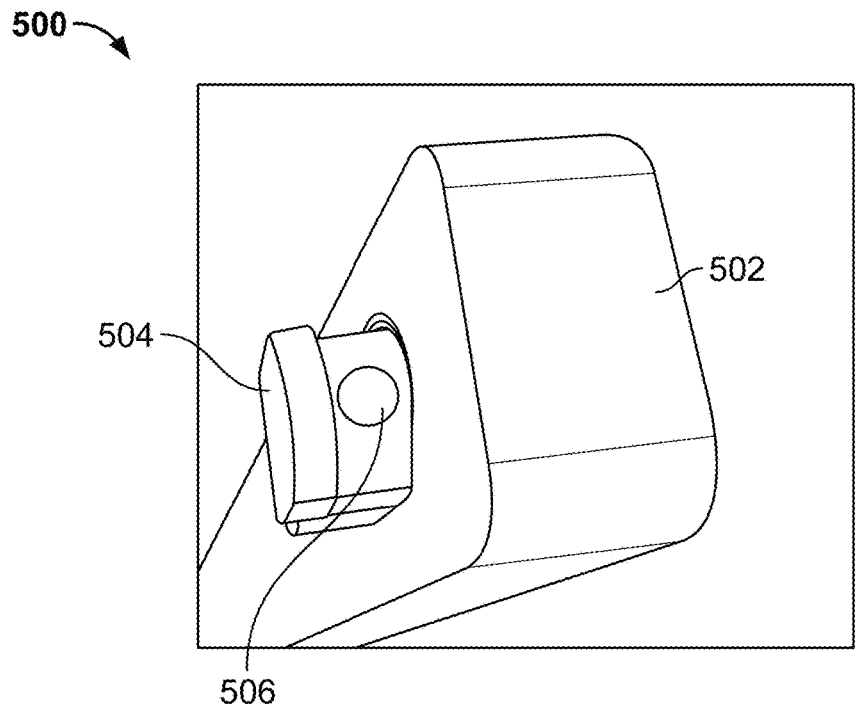
FIG. 5 depicts an exemplary electronic feature embedded in a peg of a mountable accessory; in accordance with some embodiments of the disclosure.

FIG. 5 depicts mountable accessory 500 comprising peg 504 with electrical feature 506; in accordance with some embodiments of the disclosure. Mountable accessory 500 may comprise fewer or additional elements or features than those depicted in FIG. 5. Additionally, mountable accessory 500 may be incorporated into, may interface with, and/or may comprise any or all the elements depicted in, or described in reference to, any of FIGS. 1-4 and 6-10.

Mountable accessory 500 comprises accessory housing 502. Extending from accessory housing 502 is peg 504. In some embodiments, peg 504 comprises material continuous with accessory housing 502. Peg 504 may be configured to slide laterally or rotate, depending on the configuration of a locking mechanism mechanically coupled to peg 504. Embedded in peg 504 is electrical feature 506, which is configured to interface with electrical interface 106A or 106B of FIG. 1. For example, electrical feature 506 may comprise an electrical lead configured to interface with a complementary electrical lead embedded one of plurality of through openings 104 corresponding to at least one of electrical interface 106A or 106B of FIG. 1.

Figure 6:
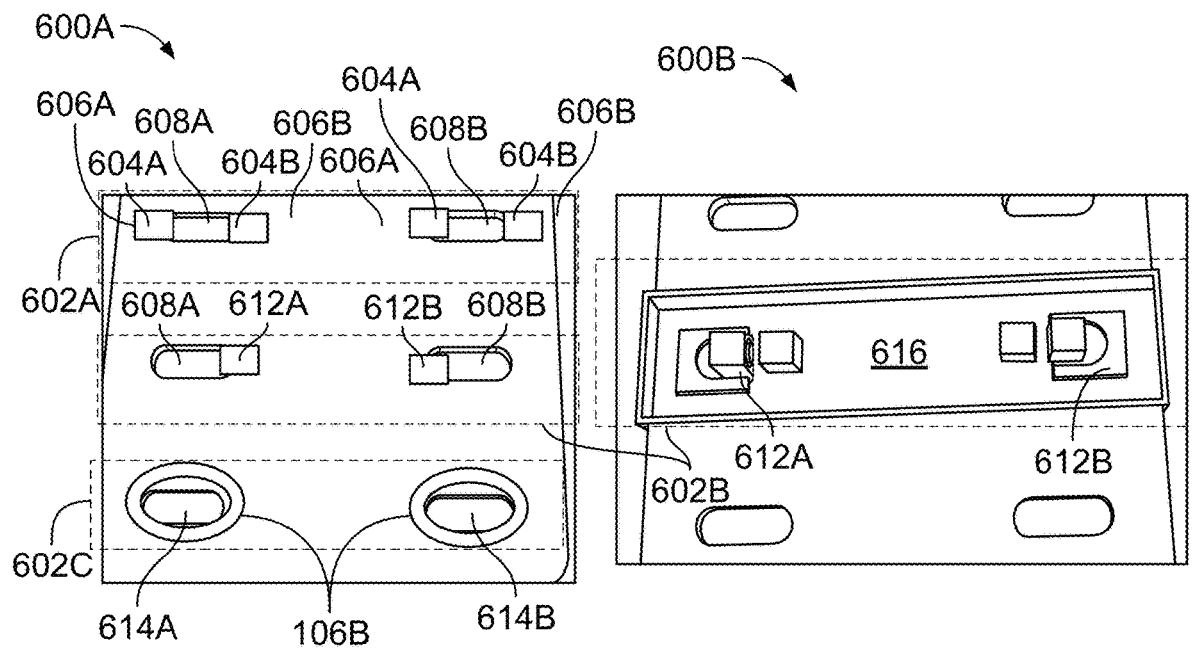
FIG. 6 depicts a vehicle bay divider comprising three rows of through openings, each of the openings comprising electrical features of different polarities, in accordance with some embodiments of the disclosure.

FIG. 6 depicts vehicle bay dividers 600A and 600B comprising three rows of through openings 104, in accordance with some embodiments of the disclosure. Vehicle bay dividers 600A and 600B may comprise fewer or additional elements or features than those depicted in FIG. 6. Additionally, vehicle bay dividers 600A and 600B may be incorporated into, may interface with, and/or may comprise any or all the elements depicted in, or described in reference to, any of FIGS. 1-5 and 7-10.

Vehicle bay divider 600A comprises first row of through openings 602A, second row of through openings 602B, and third row of through openings 602C, each of the through openings corresponding to plurality of through openings 104 of FIG. 1. First row of through openings 602A comprises first through opening 608A and second through opening 608B, each with first electrical lead 604A arranged on first side 606A and second electrical lead 604B arranged on second side 606B. In some embodiments, a first polarity of first electrical lead 604A is different from a second polarity of second electrical lead 604B. Second row of through openings 602B comprises first through opening 610A and second through opening 610B. First through opening 610 comprises first electrical feature 612A. Second through opening 610B comprises second electrical feature 612B. In some embodiments, a first polarity of first electrical feature 612A is different from a second polarity of second electrical feature 612B (e.g., both of first electrical feature 612A and second electrical feature 612B are configured to interface with a pair of electrical leads from a same mountable apparatus to provide electrical power to the mountable apparatus). Third row of through openings 602C comprises first through opening 614A and 614B, each comprising electrical interface 106B of FIG. 1 such that each of through openings 614A and 614B are configured to wireless provide electronic power to a mountable accessory or apparatus.

Vehicle bay divider 600B comprises second row of through openings 602B. Secured to each of through openings 608A and 608B is accessory housing 616. Accessory housing 616 comprises peg 618A and 618B. Peg 618A interfaces with first electrical feature 612A. Peg 618B interface with second electrical feature 612B. In some embodiments, first electrical feature 612A and second electrical feature 612B have different polarities. Accordingly, both peg 618A and 618B must be engaged in their respective through openings to enable flow of electric power from vehicle bay divider 600B to a mountable accessory comprising accessory housing 616.

FIG. 7 depicts vehicle 700 comprising front vehicle bay 702 and rear vehicle bay 704, both configured to accommodate at least one of a vehicle bay divider or mounting assembly configured to interface with accessories in a manner similar to the vehicle bay dividers of the present disclosure, in accordance with some embodiments of the disclosure. Vehicle 700 may comprise fewer or additional elements or features than those depicted in FIG. 7. Additionally, vehicle 700 may be incorporated into, may interface with, and/or may comprise any or all the elements depicted in, or described in reference to, any of FIGS. 1-6, and 8-10. Arranging a vehicle bay divider in at least one of front vehicle bay 702 or rear vehicle bay 704 corresponds to an illustrative embodiment that is not limited by the contents of this disclosure. One skilled in the art would appreciate that additional modifications may be required to either or both of fron vehicle bay 702 or rear vehicle bay 704. For example, impact criteria may be defined for a particular vehicle line which may result in corresponding structural modifications to any or all of the vehicle bay dividers of the present disclosure. The various features, assembly, and embodiments discussed herein may be omitted, modified, combined, and/or rearranged, and any additional modifications or adjustments may be performed without departing from the scope of the invention in order to accommodate various criteria for a vehicle bay and assemblies therein (e.g., responsiveness to impacts or other vehicle events). More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted that the embodiments of the inventions of the disclosure may be applied to, or used in accordance with, other systems and/or methods (e.g., at least those related to vehicle bay dividers and securing accessories to a vehicle bay divider).

Figure 8:
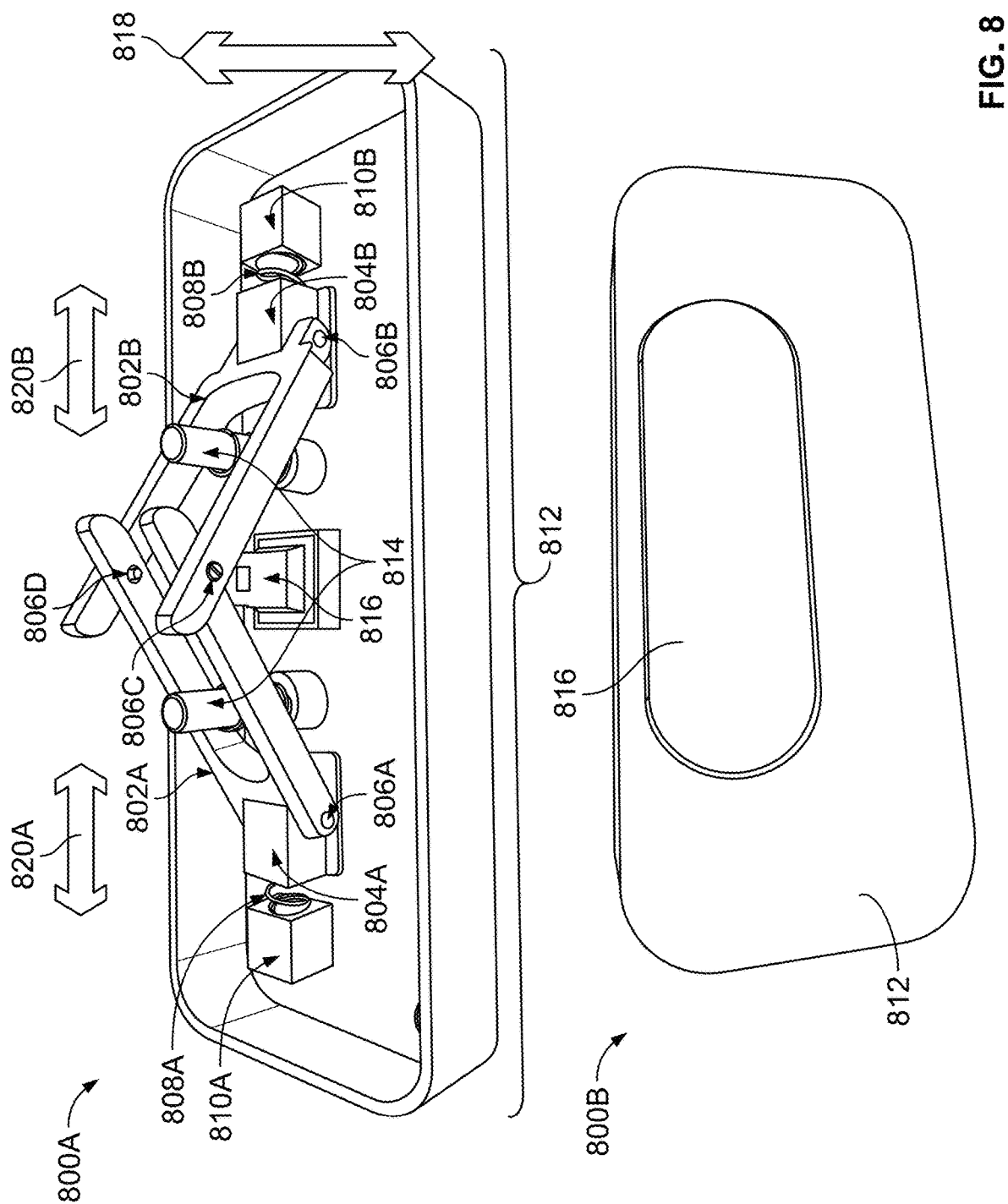
FIG. 8 depicts an exemplary mountable apparatus comprising an exemplary locking mechanism, in accordance with some embodiments of the disclosure.

FIG. 8 depicts mountable apparatuses 800A and 800B, each comprising an exemplary locking mechanism, in accordance with some embodiments of the disclosure. Mountable apparatuses 800A and 800B may comprise fewer or additional elements or features than those depicted in FIG. 8. Additionally, mountable apparatuses 800A and 800B may be incorporated into, may interface with, and/or may comprise any or all the elements depicted in, or described in reference to, any of FIGS. 1-7, 9, and 10.

Mountable apparatus 800A comprises accessory housing 812 (e.g., corresponding to accessory housing 616 of FIG. 6). Arranged within accessory housing 812 are first linkage 802A and second linkage 802B. Coupled to first linkage 802A via first pivot point 806A is first sliding peg 804A. First spring 808A is coupled at one end to first sliding peg 804A and is coupled at a second end to first anchor 810A. Coupled to second linkage 802B via second pivot point 806B is second sliding peg 804B. Second spring 808B is coupled at one end to second sliding peg 804B and is coupled at a second end to second anchor 810B. Arranged towards a center of accessory housing 812 is push-push assembly 816. Push-push assembly 816 is configured to engage and disengage the locking mechanism comprising the components of FIG. 8 by pushing and pulling first linkage 802A and second linkage 802B about pivot points 806C and 806D, respectively, such that first sliding peg 804A and second sliding peg 804B laterally translate towards and away from each of first anchor 810A and second anchor 810B, respectively. Push-push assembly 816 is configured to actuate along axis 818 such that a first input presses push-push assembly 816 into an engaged position and a second input presses push-push assembly 816 into a disengaged position. Arranged on either side of push-push assembly 816 are guide rods 814. In some embodiments, guide rods 814 comprise externally wound or internally wound springs configured to counter act compression of push-push assembly 816 in response to either the first or second input. In response to the first input, first sliding peg 804A is configured to move towards first anchor 810A along sliding axis 820A. In response to the second input, first sliding peg 804A is configured to move towards push-push assembly 816 along sliding axis 820A in a direction opposite to the response to the first input. In response to the first input, second sliding peg 804B is configured to move towards second anchor 810B along sliding axis 820B. In response to the second input, second sliding peg 804B is configured to move towards push-push assembly 816 along sliding axis 820B in a direction opposite to the response to the first input.

Mountable apparatus 800B comprises accessory housing 812 with push-push assembly 816. Push-push assembly 816 may be coupled to an electrical lead such that as push-push assembly is first compressed, the electrical lead contacts a power source and powers an apparatus, accessory, or tool associated with mountable apparatus 800B (e.g., a light, a camera, or a fan). When push-push assembly 816 is compressed a second time, guide rods 114 of mountable apparatus 800A return push-push assembly 816 to a disengaged position. In some embodiments, both first sliding peg 804A and second sliding peg 804B move away from push-push assembly 816. For example, when viewing push-push assembly 816 along the direction of the activation of push-push assembly 816 (e.g., into the page of FIG. 8), both first sliding peg 804A and second sliding peg 804B may be offset axially along the direction of activation.

FIG. 9 depicts peg assembly 900A, and mountable apparatuses 900B, 900C, and 900D, each configured to engage with a through opening in a vehicle bay divider, in accordance with some embodiments of the disclosure. Any of peg assembly 900A, mountable apparatuses 900B, 900C, and 900D may comprise fewer or additional elements or features than those depicted in FIG. 9. Additionally, any of peg assembly 900A, mountable apparatuses 900B, 900C, and 900D may be incorporated into, may interface with, and/or may comprise any or all the elements depicted in, or described in reference to, any of FIGS. 1-8, and 10.

Peg assembly 900A comprises latching tabs 902. Latching tabs 902 are coupled via actuation linkage 904. Actuation linkage 904 is configured to rotate latching tabs 902 in a clockwise manner when compression force 906A is applied to actuation protrusion 908. Compression force 906 corresponds to a compression force caused by compressing push-push assembly 816 of FIG. 8. Actuation linkage 904 is configured to rotate latching tabs 902 in a counterclockwise manner when return force 906B causes actuation protrusion 908 to translate to an original position (e.g., in response to springs arranged around guide rods 814 returning push-push assembly 816 to an original position).

Mountable apparatus 900B comprises accessory housing 812 and push-push assembly 816 of FIG. 8. Coupled to push-push assembly 816 are leads 910 which are configured to provide power to mountable accessory 912 when push-push assembly 816 is compressed while mountable apparatus 900B is engaged with at least one of through openings 104 of FIG. 1. Mountable accessory 816 may comprise at least one of a securing mechanism, a camera, a light, an environment condition controller, or a tool. Mountable apparatus 900C comprises accessory housing 914 with rotatable latching tab 916. Mountable apparatus 900C is configured to interface with at least one of through openings 104 of FIG. 1 and is configured to be secured to vehicle bay divider 102 when rotated such that latching tab 916 is oriented perpendicular to at least one of through openings 104.

FIG. 10 depicts vehicle bay divider system 1000 with vehicle bay divider 1002 arranged within vehicle bay 1004, in accordance with some embodiments of the disclosure. Vehicle bay divider system 1000 may comprise fewer or additional elements or features than those depicted in FIG. 10. Additionally, vehicle bay divider system 1000 may be incorporated into, may interface with, and/or may comprise any or all the elements depicted in, or described in reference to, any of FIGS. 1-9.

Vehicle bay divider system 1000 comprises vehicle bay divider installation assembly 1002 arranged within vehicle bay 1004. Vehicle bay 1004 corresponds to either of front vehicle bay 702 or rear vehicle bay 704 in FIG. 7. Door 1006 is arranged to open and close vehicle bay 1004. Vehicle bay divider installation assembly 1002 interfaces with storage surface 1008 of vehicle bay 1004. Storage surface 1008 may correspond to a surface of a recessed storage unit or a floor of a vehicle enclosure. Vehicle bay divider installation assembly 1002 may be secured to storage surface 1008 using: an interfacing feature of vehicle bay divider installation assembly 1002 configured to be received by a recess in storage surface 1008, a recess in vehicle bay divider installation assembly 1002 configured to receive an interfacing feature extending from storage surface 1008, and/or a combination of fasteners and other securing features.

Vehicle bay divider installation assembly 1002 comprises mounting platform 1010. Mounting platform 1010 comprises at least one securing feature (e.g., an extension or recess) configured to interface with storage surface 1008 to maintain a stable and secure connection between mounting platform 1010 and storage surface 1008. Mounting platform 1010 comprises guide rails 1012. Guide rails 1012 are recessed into a top surface of mounting platform 1010 such that a top surface of guide rails 1012 do not extend beyond the top surface of mounting platform 1010. In some embodiments, guide rails 1012 may protrude from the top surface of mounting platform 1010. Guide rails 1012 may comprise threaded rods configured to interface with mounts 1014 of divider 1016 or may comprise slotted rails configured to guide actuation features of mounts 1014 (e.g., wheels). Mounts 1014 are structured to stabilize divider 1016 relative to mounting platform 1010 such that divider 1016 is incapable of motion independent of divider 1016. Divider 1016 separates the top surface of mounting platform 1010 into first storage area 1018 and second storage area 1020. First storage area 1018 is depicted as accommodating a pet. Second storage area 1020 is depicted as accommodating equipment. A plurality of through openings are on either side of divider 1016 and are configured to provide electrical power to accessories mounted to either side of divider 1016.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples, any such reference is merely to provide context to the instant disclosure and does not form any admission as to what constitutes the state of the art.

What is claimed is:

1. An apparatus comprising:
   a push-push assembly arranged to be pressed in a direction into an engaged position by a first input and arranged to be pressed in the direction into a disengaged position by a second input;
   a first linkage and a second linkage coupled to the push-push assembly;
   a first anchor and a second anchor; and
   a first sliding peg and a second sliding peg respectively coupled to the first linkage and the second linkage, wherein actuation of the push-push assembly causes the first sliding peg and the second sliding peg to translate in opposing directions away from the push-push assembly and respectively towards the first anchor and the second anchor, into respective engaged positions for each of the first and second sliding pegs.

2. The apparatus of claim 1, further comprising:
   a first spring and a second spring respectively coupled to the first sliding peg and the second sliding peg, wherein the first spring and the second spring are respectively configured to apply opposing spring forces to the first sliding peg and the second sliding peg to cause the first sliding peg and the second sliding peg to translate towards each other into a disengaged position.

3. The apparatus of claim 1, wherein the first and second anchors comprise respective extensions from a material comprising an accessory housing in which the push-push assembly is arranged.

4. The apparatus of claim 1, wherein the first sliding peg and the second sliding peg are arranged to extend through an interior surface of an accessory housing and actuate such that both of the first sliding peg and the second sliding peg contact an edge of at least one through opening in a vehicle bay divider arranged to receive the first sliding peg and the second sliding peg.

5. The apparatus of claim 1, wherein the first linkage is configured to rotate about a first pivot point corresponding to the first sliding peg and the second linkage is configured to rotate about a second pivot point corresponding to the second sliding peg.

6. The apparatus of claim 1, wherein at least one guide rod is arranged within an accessory housing in which the push-push assembly is arranged and configured to counteract compression achieved via the push-push assembly.

7. The apparatus of claim 6, further comprising at least one spring arranged concentric to the at least one guide rod, either external to an outer diameter of a housing of the at least one guide rod or internal to an inner diameter of the housing of the at least one guide rod, wherein the at least one spring is configured to counteract compression of the push-push assembly.

8. The apparatus of claim 1, wherein the first sliding peg and the second sliding peg are spaced within an accessory housing according to a spacing of through openings in a complementary vehicle bay divider.

9. The apparatus of claim 1, wherein the push-push assembly is coupled to a guide rod configured to return the push-push assembly to the disengaged position, wherein the disengaged position corresponds to each of the first sliding peg and the second sliding peg being translated away from an interface on a vehicle bay divider opening and translated towards a center axis of the push-push assembly.

10. The apparatus of claim 9, wherein a spring, arranged concentric to the guide rod, provides a return force against the push-push assembly.

11. A mountable accessory comprising:
an accessory housing; and
a locking mechanism comprising:
a push-push assembly arranged to be pressed in a direction into an engaged position by a first input and arranged to be pressed in the direction into a disengaged position by a second input; and
two opposing linkages coupled to the push-push assembly, wherein the two opposing linkages are coupled to a first sliding peg and a second sliding peg, respectively, wherein each of the first sliding peg and the second sliding peg comprises a respective tab to interface with an edge of a through opening.

12. The mountable accessory of claim 11, wherein tabs of the push-push assembly are configured to rotate perpendicular to an elongated edge of the through opening when the push-push assembly is actuated.

13. The mountable accessory of claim 11, wherein the accessory housing comprises an accessory configured to communicate with a remote device.

14. The mountable accessory of claim 11, wherein the accessory housing comprises one of a securing mechanism, a camera, a light, an environment condition controller, or a tool.

15. The mountable accessory of claim 11, wherein the push-push assembly is configured to actuate perpendicular to the first and second sliding pegs.

16. The mountable accessory of claim 11, wherein the locking mechanism further comprises:

a first spring arranged between the first sliding peg and a first anchor; and
a second spring arranged between the second sliding peg and a second anchor, wherein the first and second springs are configured to return the first and second sliding pegs to an initial position after being displaced in opposing directions.

17. The mountable accessory of claim 11, wherein at least one guide rod is configured to counteract compression of the push-push assembly.

18. The mountable accessory of claim 11, further comprising a housing configured to be attached to an accessory apparatus.

19. A mounting assembly comprising:
a peg board; and
a mountable apparatus configured to interface with the peg board, the mountable apparatus comprising:
an accessory coupled to a locking mechanism, the locking mechanism comprising a push-push assembly arranged to be pressed in a direction into an engaged position by a first input and arranged to be pressed in the direction into a disengaged position by a second input in order to actuate two opposing latching tabs, wherein the two opposing latching tabs are coupled via two respective linkages to the push-push assembly.

\* \* \* \* \*